United States Patent
Garner et al.

(10) Patent No.: US 7,346,059 B1
(45) Date of Patent: Mar. 18, 2008

(54) HEADER RANGE CHECK HASH CIRCUIT

(75) Inventors: Trevor Garner, Apex, NC (US);
William R. Lee, Apex, NC (US); John Kenneth Stacy, Cary, NC (US);
Martin W. Hughes, Cary, NC (US);
Dennis Briddell, Cary, NC (US)

(73) Assignee: Cisco Technology, Inc., San Jose, CA (US)

( * ) Notice: Subject to any disclaimer, the term of this patent is extended or adjusted under 35 U.S.C. 154(b) by 960 days.

(21) Appl. No.: 10/657,497

(22) Filed: Sep. 8, 2003

(51) Int. Cl.
*H04L 12/26* (2006.01)
*H04J 3/14* (2006.01)
*G08C 15/00* (2006.01)
*G06F 11/00* (2006.01)

(52) U.S. Cl. .............. 370/395; 370/235; 370/389; 709/224; 709/242

(58) Field of Classification Search ........ 370/392–395, 370/396–400, 237–248; 709/238–242; 707/3, 707/104

See application file for complete search history.

(56) References Cited

U.S. PATENT DOCUMENTS

| | | | |
|---|---|---|---|
| 6,212,183 B1 | 4/2001 | Wilford | |
| 6,266,705 B1 | 7/2001 | Ullum et al. | |
| 6,457,058 B1 | 9/2002 | Ullum et al. | |
| 6,651,099 B1 * | 11/2003 | Dietz et al. ................ | 709/224 |
| 6,826,561 B2 * | 11/2004 | Cao et al. ...................... | 707/3 |
| 6,965,945 B2 * | 11/2005 | Lin et al. .................... | 709/242 |
| 7,027,446 B2 * | 4/2006 | Rosenfeld et al. ..... | 370/395.31 |
| 7,072,885 B2 * | 7/2006 | Cao et al. ..................... | 707/3 |
| 2004/0230696 A1 * | 11/2004 | Barach et al. .............. | 709/238 |
| 2006/0059196 A1 * | 3/2006 | Sato et al. ............... | 707/104.1 |

OTHER PUBLICATIONS

Radia Perlman, Interconnections, Second Edition: Bridges, Routers, Switches, and Internetworking Protocols, Addison Wesley Longman, Inc., pp. 1-17, Jan. 2000.

Siegfried Loffler, Using Flows for Analysis and Measurement of Internet Traffic, Institute of Communication Networks and Computer Engineering (IND) of the University of Stuttgart, <siegfried.loeffler@rus.uni-stuttgart.de>, Aug. 1997.

Caspian Networks, Flow-Based Routing: Rationale and Benefits, pp. 1-25, Caspian Networks, Inc., 2003.

Kimberly C. Claffy, et al., A Parameterizable Methodology for Internet Traffic Flow Profiling, pp. 1-25.

Martin Hughes, et al., Memory Efficient Hashing Algorithm, U.S. Appl. No. 10/769,941, filed Feb. 2, 2004.

* cited by examiner

*Primary Examiner*—Man U. Phan
(74) *Attorney, Agent, or Firm*—Cesari and McKenna LLP

(57) ABSTRACT

A technique efficiently searches a hash table containing a plurality of "ranges." In contrast with previous implementations, the technique performs fewer searches to locate one or more ranges stored in the hash table. To that end, the hash table is constructed so each hash-table entry is associated with a different linked list, and each linked-list entry stores, inter alia, "signature" information and at least one pair of values defining a range associated with the signature. The technique modifies the signature based on the results of one or more preliminary range checks. As a result, the signature's associated ranges are more evenly distributed among the hash table's linked lists. Thus, the linked lists are on average shorter in length, thereby enabling faster and more efficient range searches. According to an illustrative embodiment, the technique is applied to flow-based processing implemented in an intermediate network node, such as a router.

21 Claims, 9 Drawing Sheets

HEADER RANGE CHECK HASH CIRCUIT

FIELD OF THE INVENTION

This invention relates generally to a technique for locating one or more ranges stored in a hash table, and, more specifically, to applying the technique to flow-based routing in an intermediate network node, such as a router.

BACKGROUND OF THE INVENTION

A computer network is a geographically distributed collection of interconnected subnetworks for transporting data between nodes, such as computers. A local area network (LAN) is an example of such a subnetwork. The network's topology is defined by an arrangement of client nodes that communicate with one another, typically through one or more intermediate network nodes, such as a router or switch. As used herein, a client node is an endstation node that is configured to originate or terminate communications over the network. In contrast, an intermediate network node is a node that facilitates routing data between client nodes. Communications between nodes are typically effected by exchanging discrete packets of data according to predefined protocols. In this context, a protocol consists of a set of rules defining how the nodes interact with each other.

Each data packet typically comprises "payload" data prepended ("encapsulated") by at least one network header formatted in accordance with a network communication protocol. The network headers include information that enables the client nodes and intermediate nodes to efficiently route the packet through the computer network. Often, a packet's network headers include at least a data-link (layer 2) header, an internetwork (layer 3) header and a transport (layer 4) header, as defined by the Open Systems Interconnection (OSI) Reference Model. The OSI Reference Model is generally described in more detail in Section 1.1 of the reference book entitled *Interconnections Second Edition*, by Radia Perlman, published September 1999, which is hereby incorporated by reference as though fully set forth herein.

The data-link header provides information for transmitting the packet over a particular physical link (i.e., a communication medium), such as a point-to-point link, Ethernet link, wireless link, optical link, etc. To that end, the data-link header may specify a pair of "source" and "destination" network interfaces that are connected by the physical link. A network interface contains the mechanical, electrical and signaling circuitry and logic used to couple a network node to one or more physical links. A network interface is often associated with a hardware-specific address, known as a media access control (MAC) address. Accordingly, the source and destination network interfaces in the data-link header are typically represented as source and destination MAC addresses. The data-link header may also store flow control, frame synchronization and error checking information used to manage data transmissions over the physical link.

The internetwork header provides information defining the packet's logical path (or "virtual circuit") through the computer network. Notably, the path may span multiple physical links. The internetwork header may be formatted according to the Internet Protocol (IP), which specifies IP addresses of both a source and destination node at the end points of the logical path. Thus, the packet may "hop" from node to node along its logical path until it reaches the client node assigned to the destination IP address stored in the packet's internetwork header. After each hop, the source and destination MAC addresses in the packet's data-link header may be updated, as necessary. However, the source and destination IP addresses typically remain unchanged as the packet is transferred from link to link in the network.

The transport header provides information for ensuring that the packet is reliably transmitted from the source node to the destination node. The transport header typically includes, among other things, source and destination port numbers that respectively identify particular software applications executing in the source and destination nodes. More specifically, the packet is generated in the source node by the application assigned to the source port number. Then, the packet is forwarded to the destination node and directed to the application assigned to the destination port number. The transport header also may include error-checking information (i.e., a checksum) and other data-flow control information. For instance, in connection-oriented transport protocols such as the Transmission Control Protocol (TCP), the transport header may store sequencing information that indicates the packet's relative position in a transmitted stream of data packets.

As used herein, a data flow is a stream of data packets that is communicated from a source node to a destination node. Each packet in the flow satisfies a set of predetermined criteria, e.g., based on the packet's contents, size or relative position (i.e., temporal or spatial) in the data flow. For example, the predetermined criteria may require each packet in the flow to satisfy one or more "range checks" performed on selected values stored in the packet's network headers. Here, a range is defined as a set of numbers whose values are between predetermined upper- and lower-bound values. Thus, a range check determines whether a selected value falls within the range, i.e., between the range's upper and lower bounds, inclusive. Accordingly, in this example, the packet may be classified as part of the data flow if the values stored in selected fields of the packet's headers satisfy the data flow's associated range checks.

An intermediate network node may be configured to perform "flow-based" routing operations so as to route each packet in a data flow in the same manner. The intermediate node typically receives data packets in the flow and forwards the packets in accordance with predetermined routing information that is distributed using a protocol, such as the Open Shortest Path First (OSPF) protocol. Because each packet in the flow is addressed to the same destination node, the intermediate node need only perform one forwarding decision for the entire data flow, e.g., based on the first packet received in the flow. Thereafter, the intermediate node forwards packets in the data flow based on the flow's previously determined routing information (i.e., adjacency information). In this way, the intermediate node consumes fewer resources, such as processor bandwidth and processing time, than it would if it performed a separate forwarding determination for every packet it receives in the data flow.

In practice, the intermediate network node may implement a hash table which stores a plurality of ranges and other packet-related information used to classify received packets into their corresponding data flows. The hash table is typically organized as a table of linked lists, where each list may be indexed by the result of applying a conventional hash function to "signature" information. In this context, a signature is a set of values that remain constant for every packet in a data flow. For example, assume each packet in a first data flow stores the same pair of source and destination IP address values. In this case, a signature for the first data flow may be generated based on the values of these source and destination IP addresses. Likewise, a different signature may be generated for a second data flow whose packets store a different set of source and destination IP addresses than packets in the first data flow. Of course, those skilled in the art will appreciate that a data flow's signature information is not limited to IP addresses and may include other information, such as TCP port numbers, IP version numbers and so forth.

Each linked list in the hash table contains one or more entries, and each linked-list entry stores information corresponding to a particular data flow. Such information may include, inter alia, the data flow's associated signature information, one or more ranges for performing the data flow's range checks and a data-flow identifier ("flow ID"). Typically, each range stored in the linked-list entry is represented by a pair of upper- and lower-bound values. The flow ID identifies the particular data flow and also may be used to locate routing information associated with the data flow. To that end, the intermediate network node may maintain a data structure that maps flow ID values to the memory locations of their corresponding routing information, e.g., stored in the node's "in-core" memory. Alternatively, the flow ID values may directly incorporate the memory locations of their data flows' routing information.

When a packet is received by the intermediate network node, signature information is extracted from the packet's network headers and hashed using a conventional hash function, such as a cyclic redundancy check (CRC) function. The resultant hash value is used to index a hash-table entry which, in turn, references a linked list. Entries in the linked list are accessed sequentially until a "matching" entry is found storing both the extracted signature and a set of ranges including one or more software-specified "target" values. Like the packet's signature, the target values may be extracted from selected fields in the packet's headers and therefore may include IP addresses, TCP port numbers, etc. In some cases, the extracted target values may overlap information in the packet's signature, although the target values more generally include any values for which range checks can be performed. Thus, even if a linked-list entry contains the packet's signature, the entry is not considered a "match" unless it also contains a set of ranges including each of the extracted target values. When a matching linked-list entry is located, the entry' stored flow ID is used to associate the received packet with a data flow and the packet is routed in accordance with that flow.

Conventional flow-based routing, as described above, suffers the disadvantage that the intermediate network node may have to search a large number of linked-list entries before locating a matching entry for the received data packet. For instance, suppose a relatively large number of different data flows are associated with the packet's signature and the flows differ based on their associated sets of target-value ranges. In this case, the packet's hashed signature value indexes a linked list containing multiple entries that store the packet's signature—namely, one entry for each set of target-value ranges associated with the signature. For a large number of different ranges associated with the signature, the linked list may contain an exorbitant number of entries that may have to be sequentially searched before a matching entry can be found. Consequently, the process of searching the linked list and performing a comparison of each list entry's associated target-value range checks may consume an unreasonable amount of time and resources due to the large number of list entries that may have to be traversed.

This problem is compounded when two or more different signatures "collide" in the hash table. A plurality of signatures are said to collide when their hash values generate the same hash-table index. Therefore, linked-list entries associated with the colliding signatures are essentially merged into a single linked list. As such, list lengths in the hash table grow longer as the number of signature collisions increases. The combined effect of having multiple signatures collide and having some (or all) of those signatures associated with a plurality of different target-value ranges results in linked lists that become so lengthy that they require prohibitive amounts of time and resource consumption to search during conventional flow-based routing.

There is therefore a need for a faster, more efficient technique for locating one or more desired ranges in a hash table, without having to traverse as many linked-list entries as conventionally required. The technique should reduce the amount of time and resources, such as processor bandwidth and processing time, that an intermediate network node consumes when performing flow-based routing.

SUMMARY OF THE INVENTION

The present invention provides a technique for efficiently searching a hash table containing a plurality of "ranges." In contrast with previous implementations, the technique performs fewer searches to locate one or more ranges stored in the hash table. To that end, the hash table is constructed so each hash-table entry is associated with a different searchable data structure, such as a linked list or search tree. Each of the hash table's data structures contains zero or more search nodes configured to store, inter alia, "signature" information. Each search node additionally may store one or more pairs of values defining ranges associated with the node's stored signature. Conventionally, the signature is used to locate a searchable data structure in the hash table, then the located data structure is sequentially searched until a search node is found containing the signature and one or more desired ranges. In contrast, the inventive technique modifies the signature based on the results of one or more preliminary range checks. As a result, the signature' associated ranges are more evenly distributed among the hash table's searchable data structures. Thus, the hash table's data structures, on average, contain fewer search nodes, thereby enabling faster and more efficient range searches.

In accordance with the inventive technique, each of the preliminary range checks is associated with a corresponding predefined range of values. Notably, the different predefined ranges need not be mutually exclusive and may overlap in some embodiments. In operation, one or more acquired "target" values are tested by the preliminary range checks, preferably in parallel. For each of these range checks, if the target value is located within the range check's associated range of values, a first binary value (e.g., "1") is outputted; otherwise, the range check outputs a second binary value (e.g., "0"). The output values of the preliminary range checks are concatenated to the signature in a predetermined order, and the resultant signature is subsequently used to locate a searchable data structure in the hash table.

According to an illustrative embodiment, the inventive technique is applied to flow-based routing implemented in an intermediate network node, such as a router. In this embodiment, a data packet is received by the node, and one or more software-specified target values are extracted from headers prepended to the received packet. A different set of preliminary range checks is performed for each extracted target value, and the results of the preliminary range checks are concatenated to the packet's associated signature information. The modified signature is then used to index a hash-table entry, which in turn references a corresponding linked list. The list is sequentially searched until an entry is found containing both the signature and a set of ranges including each of the packet's extracted target values. The linked-list entry also stores an indication of the packet's associated data flow. Thus, the packet may be routed in accordance with its identified data flow. If no "matching" linked-list entry is found, then the packet may be forwarded based on conventional routing techniques known in the art. Moreover, if the packet begins a new data flow, a linked-list entry associated with that flow may be added ("learned") to an appropriate list in the hash table.

Advantageously, the intermediate network node locates a set of ranges stored in the hash table by searching fewer linked-list entries than traditionally required for flow-based routing. As a result, the node consumes fewer resources, such as processor bandwidth and processing time, when routing a received data packet, thereby enabling the node's routing throughput to increase. Illustratively, the hash-table searching technique is implemented as a hardware assist in the intermediate node, although the technique may be employed in various combinations of software and/or hardware.

BRIEF DESCRIPTION OF THE DRAWINGS

The above and further advantages of the invention may be better understood by referring to the following description in conjunction with the accompanying drawings in which like reference numerals indicate identically or functionally similar elements, of which.

DETAILED DESCRIPTION OF ILLUSTRATIVE EMBODIMENTS

A. Network Environment

Figure 1:
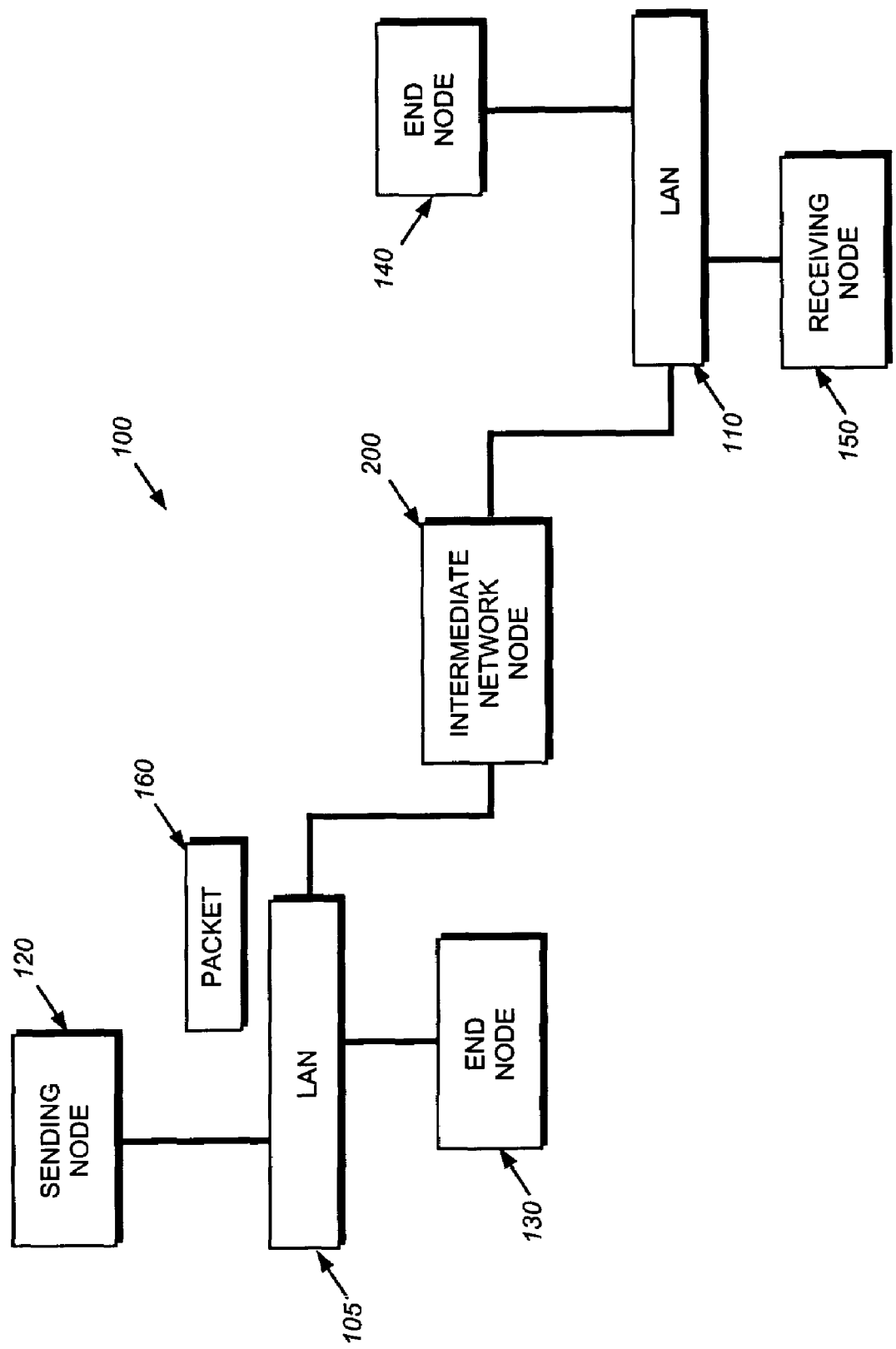
FIG. 1 is a schematic block diagram of a computer network comprising a collection of interconnected subnetworks and nodes, including an intermediate network node.

FIG. 1 is a block diagram of a computer network 100 comprising a collection of interconnected subnetworks and nodes. The nodes may comprise computers including end nodes 130 and 140, such as a sending end node 120 and a receiving end node 150, and an intermediate network node 200, the latter of which may be a switch or router. The subnetworks 105, 110 included within network 100 are preferably local area networks (LANs) interconnected by the intermediate node 200, although the networks may comprise other communication links, such as wide area networks. Communication among the nodes coupled to the LANs is typically effected by exchanging discrete packets 160 among the nodes.

For example, the sending node 120 generates a data packet 160 by encapsulating "payload" data within headers, such as conventional data link and internetwork headers, as the data passes through different layers of a protocol stack. The packet is then transmitted over the network to the intermediate node 200 which facilitates the flow of the data packet through the network by routing it to the proper receiving node 150. Specifically, the node 200 receives the packet at one of its network interfaces and renders a forwarding decision for the packet based on a destination end node specified by the packet's internetwork header. The packet's data link header is modified in accordance with the forwarding decision and the packet is transmitted over an appropriate subnetwork coupled to the intermediate network node.

Figure 2:
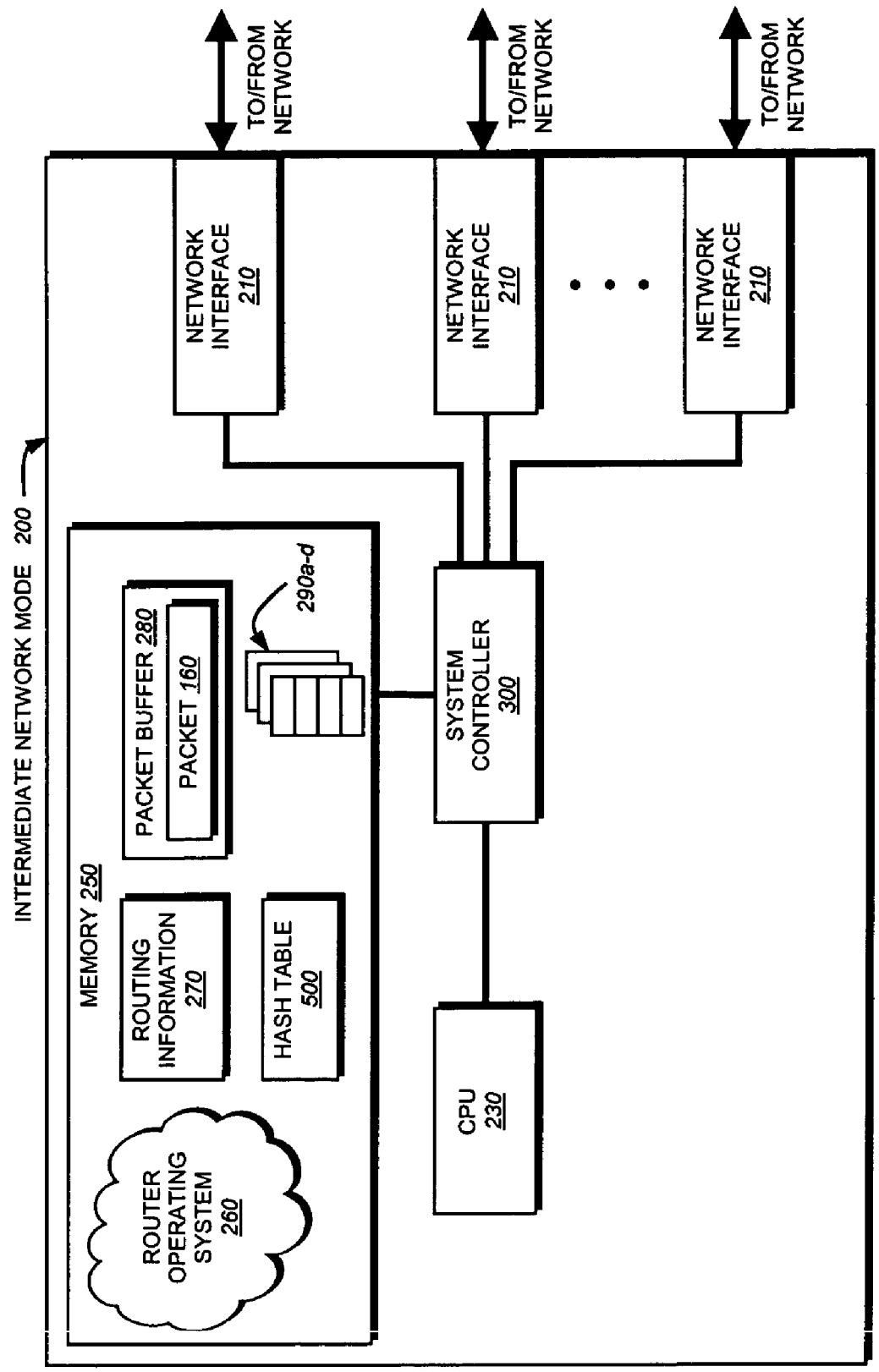
FIG. 2 is a schematic block diagram of an illustrative intermediate network node.

FIG. 2 is a schematic block diagram of an intermediate node 200 that may be advantageously used with the present invention. The node comprises a plurality of network interfaces 210, a system controller 300, a central processing unit (CPU) 230 and a memory 250. Data is received by the network interfaces 210, each of which is coupled to at least one network or subnetwork, such as LANs 105 and 110. The network interfaces contain the mechanical, electrical and signaling circuitry that enables the intermediate network node 200 to communicate over physical links connected to networks and subnetworks, including, inter alia, asynchronous transfer mode (ATM) networks, synchronous optical networks (SONET), wireless networks, frame relay networks, Ethernet networks, Fiber Distributed Data Interface (FDDI) networks, etc.

The system controller 300 is coupled to each network interface 210, the CPU 230 (i.e., a processor) and the memory 250 by different local buses in the intermediated network node 200. For instance, the system controller may be coupled to the network interfaces 210 by respective peripheral component interconnect (PCI) buses, whereas the controller may be coupled to the memory 250 by a plurality of high-speed connections, such as HyperTransport bus links. The controller 300 therefore functions as a "bridge" for transferring data from one local bus to another. That is, the controller receives data over a first local bus, e.g., coupled to a network interface 210, and converts the data to a format that may be transmitted over a second local bus, e.g., coupled to the memory 250. The system controller may also include other functionality, such as application-specific circuitry or logic. Illustratively, the controller 300 may be embodied in hardware as a field-programmable gate array (FPGA) or an application-specific integrated circuit (ASIC), although the controller's functionality alternatively may be implemented in various combinations of hardware and/or software.

The memory 250 comprises a plurality of storage locations that are addressable by the CPU 230 via the system controller 300. The memory comprises a form of random access memory (RAM) that is generally cleared by a power cycle or other reboot operation (e.g., it is a "volatile" memory). For instance, the memory 250 may comprise dynamic random access memory (DRAM) and/or synchronous DRAM (SDRAM) storage locations adapted to store program code and data structures accessible to the CPU 230. It will be apparent to those skilled in the art that the memory 250 may also comprise other memory means, including various computer-readable media, for storing program instructions and data structures pertaining to the operation of the intermediate network node 200.

A router operating system 260, portions of which are typically resident in the memory 250 and executed by the CPU 230, functionally organizes the intermediate network node 200 by, inter alia, invoking network operations in support of software processes executing on the intermediate node. The IOS™ operating system by Cisco Systems, Inc. is one example of a router operating system 260. The operating system may perform routing operations on data packets 160 received by the network interfaces 210. Accordingly, a portion of the memory 250 may be organized as a "pool" of packet buffers 280 configured to store received data packets. Operationally, a received packet 160 is transferred from a network interface 210 to one or more of the buffers 280, and a memory reference (i.e., a "descriptor") to the received packet may be stored in an appropriate "ingress" descriptor ring 290*a* (i.e., a circular first-in, first-out queue). In this manner, the ingress ring 290*a* records the relative order in which packets are received by the network interfaces and thus the order in which they are processed by the router operating system.

The router operating system 260 dequeues the packet's descriptor from the ingress ring and renders a forwarding decision for the packet based on routing information 270 stored in the memory 250. One or more data structures, such as the hash table 500, may be stored in the memory for facilitating the operating system's forwarding decision. For example, the hash table 500 may be used to identify a data flow associated with the received packet, and the routing information 270 may store adjacency information associated with the identified flow. In this case, the packet's network headers are modified in accordance with the adjacency information associated with the packet's identified data flow. The descriptor for the processed packet is then enqueued in an "egress" descriptor ring 290*b* that stores the order in which processed packets are forwarded by the intermediate network node 200. When the packet's descriptor reaches the "head" of the egress ring, the descriptor is dequeued from the egress ring and the packet is forwarded over an appropriate network interface 210. It is noted that other ingress and egress data structures besides those described above, also may be stored in the memory 250 to implement packet-queuing operations in the intermediate network node. For instance, such data structures may include hardware-assist ingress and egress data structures 290*c* and 290*d*.

Figure 3:
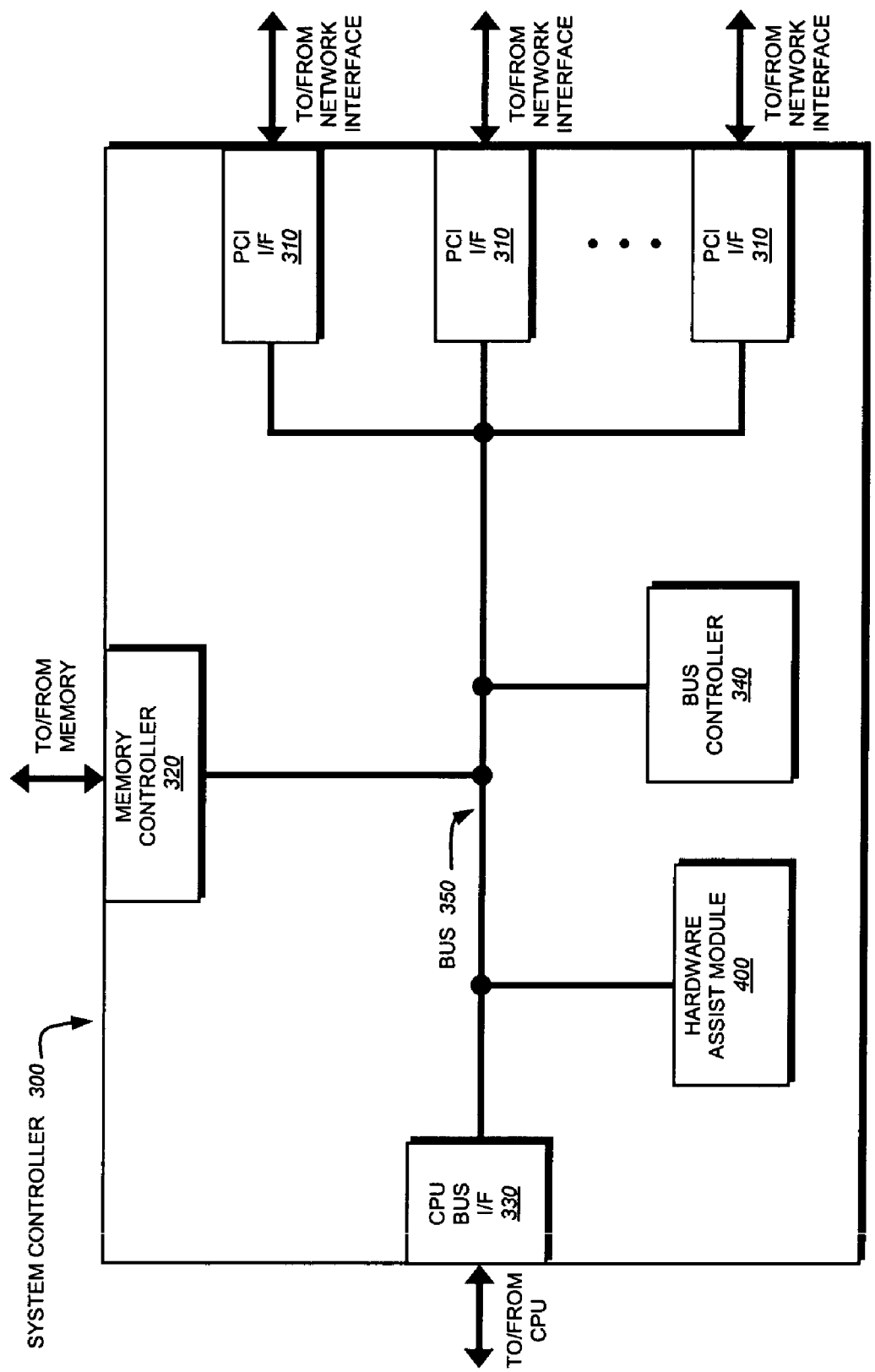
FIG. 3 is a schematic block diagram of an exemplary system controller that may be implemented in an intermediate network node.

FIG. 3 is a schematic block diagram of a system controller 300 that may be implemented in the illustrative intermediate network node 200. The system controller comprises a plurality of first local bus (PCI) interfaces 310, a memory controller 320, a CPU bus interface 330, a bus controller 340 and a hardware assist module 400 interconnected by a system-controller bus 350. In an illustrative embodiment, each PCI interface 310 includes circuitry and logic configured to send and receive data over a PCI bus coupled to a network interface 210. However, the PCI interfaces 310 alternatively may be configured to communicate over other types of buses, such as Industry Standard Architecture (ISA) buses, Extended ISA (EISA) buses, etc. Data received at a network interface 210 is forwarded over a PCI bus to a PCI interface 310, which frames the received data so it may be transferred over the system-controller bus 350. Conversely, each PCI interface may receive data from the bus 350 and reformat the data for transmission over a PCI bus coupled to a network interface.

The memory controller 320 comprises circuitry and logic configured to transfer data from the memory 250 over the second local bus to the system-controller bus 350, and vice versa. For instance, the CPU 230 may forward a memory address (or range of addresses) to the CPU bus interface 330. The memory address may be accompanied by a CPU instruction to read or write data at that memory address. The CPU bus interface 330 transmits the memory address and its corresponding CPU instruction over the system-controller bus 350 to the memory controller 320. In response, the memory controller writes or retrieves data at the specified memory address, in accordance with the CPU instruction.

The bus controller 340 comprises circuitry and logic that, inter alia, implements an arbitration policy for coordinating access to the system-controller bus 350. That is, the controller 340 prevents two or more entities, such as the PCI interfaces 310, memory controller 320, etc., from attempting to access the bus 350 at substantially the same time. To that end, the bus controller 340 may be configured to grant or deny access to the bus 350 based on a predefined arbitration protocol.

According to the illustrative embodiment, the system controller 300 includes a hardware assist (HWA) module 400. Broadly stated, one or more functions normally performed by the router operating system 260 may be "offloaded" to the HWA module. For instance, in the illustrative embodiment, the module 400 includes circuitry and logic configured to implement a technique for efficiently searching a hash table containing a plurality of ranges. The technique associates a received data packet with a corresponding data flow, thereby enabling the router operating system to perform flow-based routing in a more efficient manner than conventionally done.

B. Efficient Hash-Table Range Retrieval

The present invention provides a technique for efficiently searching a hash table containing a plurality of ranges. To that end, the hash table is constructed so each hash-table entry is associated with a different linked list, and each linked-list entry stores, inter alia, "signature" information and at least one pair of values defining a range associated with the signature. Conventionally, the signature is used to locate a linked list in the hash table, then the list is sequentially searched until an entry is found containing the signature and one or more desired ranges. In contrast, the inventive technique modifies the signature based on the results of one or more preliminary range checks. As a result, the signature' associated ranges are more evenly distributed among the hash table's linked lists. Thus, the linked lists are on average shorter in length, thereby enabling faster and more efficient range searches.

In accordance with the illustrative embodiment, the inventive technique is applied to flow-based routing implemented in the intermediate network node 200. Specifically, the process of identifying a packet's associated data flow is "offloaded" from the router operating system 260 to the HWA module 400 in the intermediate network node. As such, the operating system does not consume processor bandwidth or processing time identifying packet flows; consequently, the operating system 260 can better utilize its resources for locating routing information 270 and making forwarding decisions. Furthermore, the HWA module 400 employs a novel technique for identifying packets' data flows, as set forth by the present invention. Specifically, for each data packet 160 processed by the HWA module, the module 400 utilizes the results of one or more preliminary range checks to reduce the amount of time traditionally required to locate the packet's data flow in a hash table.

Figure 4:
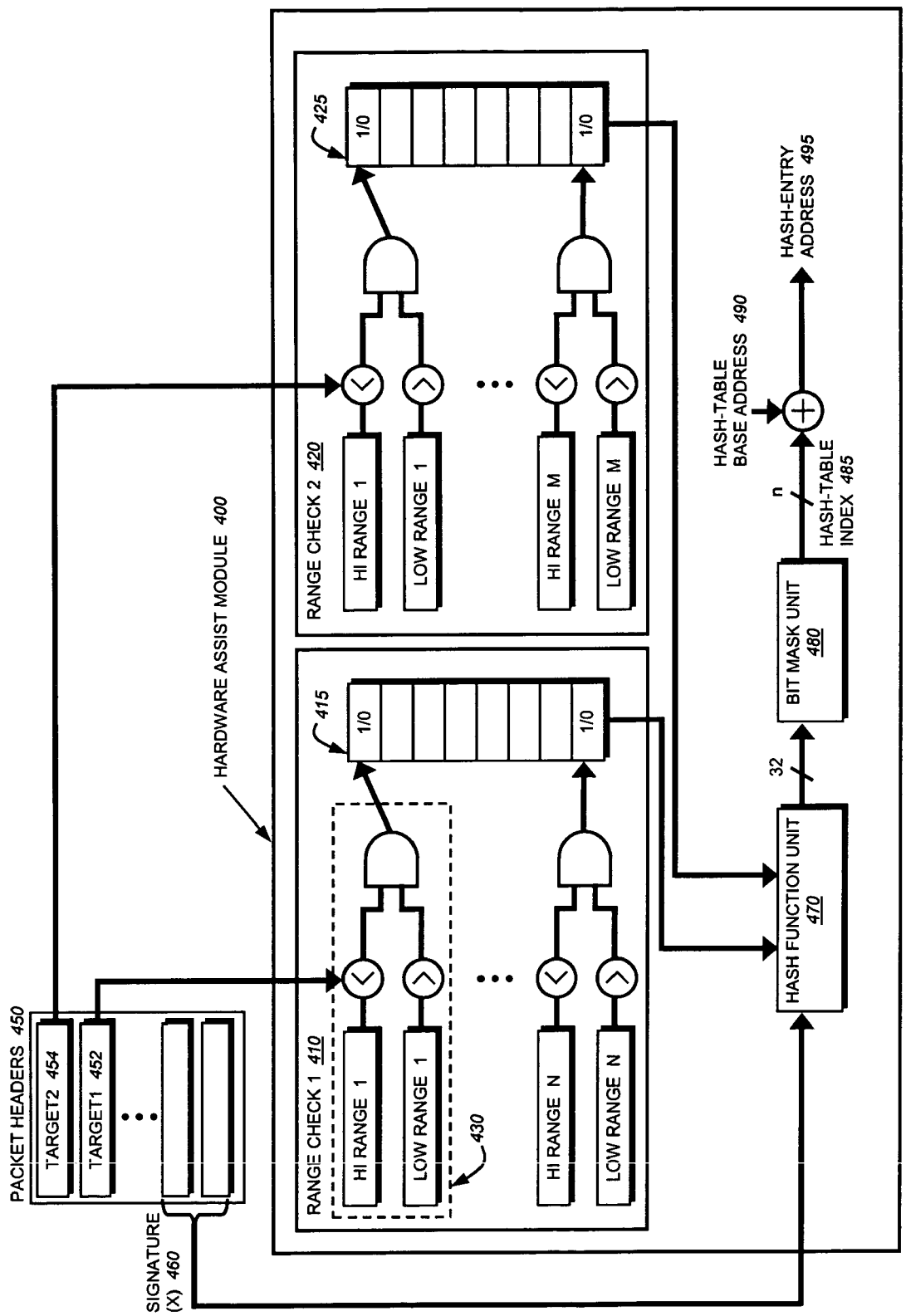
FIG. 4 is a schematic block diagram of a portion of an exemplary hardware assist circuit that may be configured to perform one or more preliminary range checks in accordance with the present invention.

FIG. 4 illustrates a portion of the HWA module 400 that may be used to perform preliminary range checks in accordance with the illustrative embodiment. After a data packet 160 is received at a network interface 210 and transferred to one or more of the packet buffers 280, the HWA module 400 can extract one or more "target" values from predetermined fields in the packet's network headers 450, e.g., the packet's data-link, internetwork and transport headers, or from other packet-related information. For example, the extracted target values may correspond to the packet's source or destination MAC addresses, TCP port numbers, IP addresses, etc. For purposes of explanation, assume the HWA module 400 is configured to extract two target values 452 and 454 stored in different predetermined fields of the packet headers 450. Although only two target values are extracted in the illustrated embodiment, those skilled in the art will understand that the inventive technique is equally applicable to an arbitrary number of extracted target values.

In general, the HWA module 400 inputs each extracted target value into a separate range-check unit. For instance, the target values 452 and 454 are input to the range-check units 410 and 420, respectively. In other embodiments, the HWA module may employ additional range-check units, depending on the number of extracted target values. Each range-check unit is configured to perform a predefined set of preliminary range checks on its inputted target value. Advantageously, each range-check unit can be selectively enabled or disabled, e.g., by a respective enable signal (not shown). Thus, for the received packet 160, the HWA module may be configured to selectively activate one or both of the range-check units 410 and 420. Moreover, the HWA module may be configured to disable both the range-check units, thereby performing no preliminary range checks.

The range-check unit 410 is configured to perform a set of N preliminary range checks on the target value 452, and the range-check unit 420 is configured to perform a set of M preliminary range checks on the target value 454, where N and M are positive integer values. Operationally, each preliminary range check determines whether its inputted target value is included in a predefined range of values, e.g., defined by a pair of upper- and lower-bound values. The different predefined ranges tested by each range-check unit need not be mutually exclusive and, in some embodiments, may at least partially overlap. Illustratively, each preliminary range check performed in the range-check units 410 and 420 is implemented by a corresponding range-check circuit 430.

Each range-check circuit 430 contains two comparators that compare an inputted target value to a predefined pair of upper- and lower-bound values (i.e., "HI RANGE" and "LOW RANGE" values). As shown, a first comparator in the circuit 430 outputs a logical "high" value (e.g., "1") if the target value is less than the predefined upper-bound value and outputs a logical "low" value (e.g., "0") otherwise. Similarly, the output of the circuit's second comparator is a logical high value if the target value is greater than the predefined lower-bound value and equals a logical low value otherwise. The outputs of the two comparators are input to a logical AND gate which, in turn, generates an output value for the range-check circuit 430. In this way, the circuit 430 outputs a logical high value only when the target value falls within the circuit's predefined upper- and lower-bound values. Preferably, one or more of the range-check circuits 430 operate in parallel. It is expressly contemplated that the range-check circuits 430 also can be implemented by other combinations of hardware and/or software configurations that function in the manner described above.

Each binary output value (e.g., "1" or "0") generated by the AND gates in the range-check circuits 430 is stored in a corresponding entry of an output vector 415 or 425. As shown, the range-check unit 410's output vector 415 stores the results of the N preliminary range checks (e.g., N equals eight) performed on the target value 452. The output vector 425 in range-check unit 420 stores the results of the M preliminary range checks (e.g., M equals eight) applied to the target value 454. While the sizes of the vectors 415 and 425 are preferably N and M bits, respectively, the output-vector sizes alternatively may be adjusted, e.g., to be padded to a predetermined bit length.

The output vectors 415 and 425 are input to a hash-function unit 470 in the HWA module 400. The hash-function unit also receives signature information 460 associated with the packet's data flow. Like the extracted target values, the signature 460 is extracted from one or more predetermined fields in the packet headers 450 or from other packet-related information. For instance, the signature information may be extracted from predetermined fields in the packet's layer-2, layer-3 and/or layer-4 network headers. However, unlike the extracted target values, the extracted signature may include information that cannot be range checked, such as packet identification values, flag values, etc. For purposes of discussion, assume that the signature fields extracted from the illustrated packet headers 450 are grouped as a single quantity hereby denoted as "X."

After the signature 460 is input to the hash-function unit 470, the signature is combined with the contents of the output vectors 415 and 425 to generate a modified signature. In the illustrative embodiment, the signature is modified by concatenating the output vectors 415 and 425 to the signature 460 in a predetermined order. For instance, the contents of the output vectors may be sequentially appended or prepended to the signature 460. The hash-function unit 470 then applies a hash function to the modified signature. For example, the hash function may be a conventional CRC-32 hash function that generates a 32-bit hash value. In alternate embodiments, the hash function unit 470 may be configured to apply other hash functions, such as the Message Digest 5 function, to the modified signature.

The hash value generated by the hash-function unit 470 is forwarded to a bit-mask unit 480 in the HWA module 400. Suppose the hash-function 470 outputs a 32-bit hash value. In this case, the bit mask unit 480 receives the 32-bit hash value and selects n bits of the 32 received hash bits. For instance, the bit mask unit may be configured to select the eight least-significant bits of the 32-bit hash value by ANDing the received hash value with a "mask" value equal to 0x000000FF (in hexadecimal). The n selected bits may function as a hash-table index 485 that uniquely identifies a specific entry in a hash table having $2^n$ entries. The index 485 may be converted to the memory address 495 of its indexed hash-table entry, e.g., located in the memory 250. For example, assuming each hash-table entry is a byte wide, the hash-table index 485 may be added to the base memory address 490 of the hash table to derive the indexed hash-table entry's memory address 495.

Figure 5:
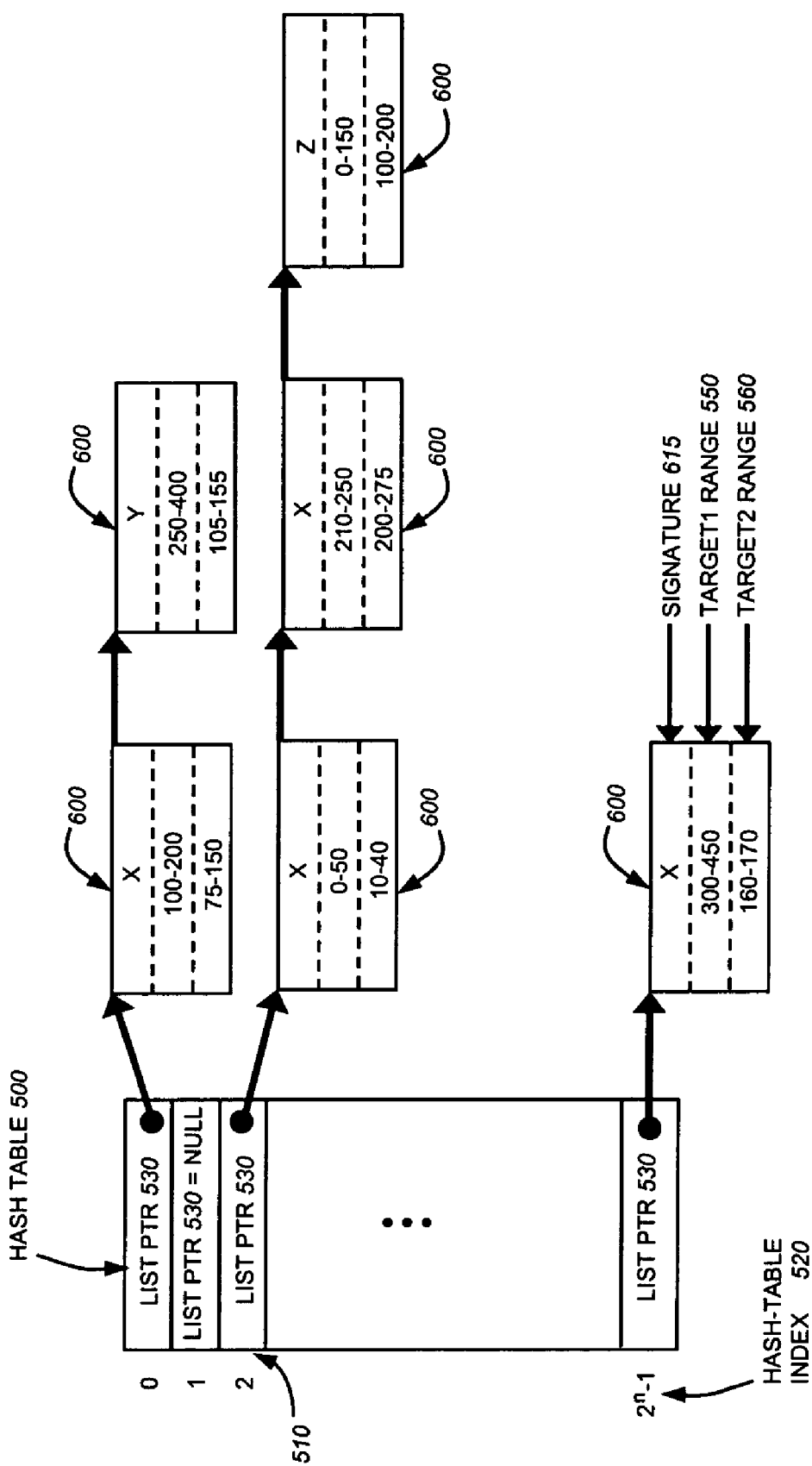
FIG. 5 is a schematic block diagram of an illustrative hash table through which a plurality of ranges may be accessed in accordance with the present invention.

FIG. 5 is a schematic block diagram of a hash table 500 configured to store a plurality of ranges which may be searched by the HWA module 400. The hash table contains $2^n$ hash-table entries 510, each of which is associated with a unique hash-table index 520 and is configured to store a list pointer value 530 referencing the memory location, e.g., in the memory 250, of a corresponding linked list. Alternatively, rather than store list pointer values 530, the hash-table entries instead may be configured to directly store the first entry of their referenced linked lists. A hash-table entry's list pointer value 530 may equal a predetermined "NULL" value if its referenced list does not contain any list entries 600, i.e., its referenced linked list is "empty."

On the other hand, each "non-empty" linked list includes one or more entries 600 which store, inter alia, signature information 615 as well as target-value ranges 550 and 560 corresponding to each extracted target value, e.g., target values 452 and 454. The stored ranges 550 and 560 may differ among the linked-list entries 600. Moreover, the target-value ranges stored in a list entry 600 generally do not have to correspond one-to-one with the extracted target values. That is, each linked-list entry may include zero or more target-value ranges for each extracted target value. Further, the ranges 550 and 560 are not necessarily related to any of the N and M predefined ranges that are used by the range-check units 410 and 420 for performing preliminary range checks on the extracted target values. For simplicity, FIG. 5 illustrates abbreviated versions of the linked-list entries 600, which are described below in more detail.

As noted, for a received data packet 160, the HWA module 400 locates a linked list in the hash table 500 based on the hashed value of the packet's modified signature (e.g., its signature 460 concatenated with its output vectors 415 and 425). Then, the HWA module "walks" sequentially through the list's linked-list entries 600 until the HWA module identifies an entry 600 that "matches" the received data packet 160. Namely, a linked-list entry 600 is determined to match the received packet when the list entry contains both the packet's signature information 460 and a set of target-value ranges 550 and 560 including each of the packet's extracted target values 452 and 454. In the event that the HWA module traverses the entire linked list without locating a matching linked-list entry 600, the HWA module 400 may be configured to notify the router operating system 260, e.g., by setting a flag value in the memory 250, that no matching linked-list entry 600 for the packet could be found.

Advantageously, because the linked-list entries 600 are inserted in the hash table 500 based on their data flows' modified signatures, data flows associated with a common signature are not necessarily stored in the same linked list, as conventionally done. Instead, linked-list entries 600 for data flows having the same signature are more evenly distributed among the hash table's linked lists. For example, linked-list entries 600 storing a signature 615 equal to X are dispersed among a plurality of linked lists, whereas prior implementations would require each of these entries to be stored in the same linked list. Therefore, the lengths of the linked lists in the hash table 500 are on average shorter than in previous implementations, thereby reducing the number of linked-list entries that are searched in the hash table.

Figure 6:
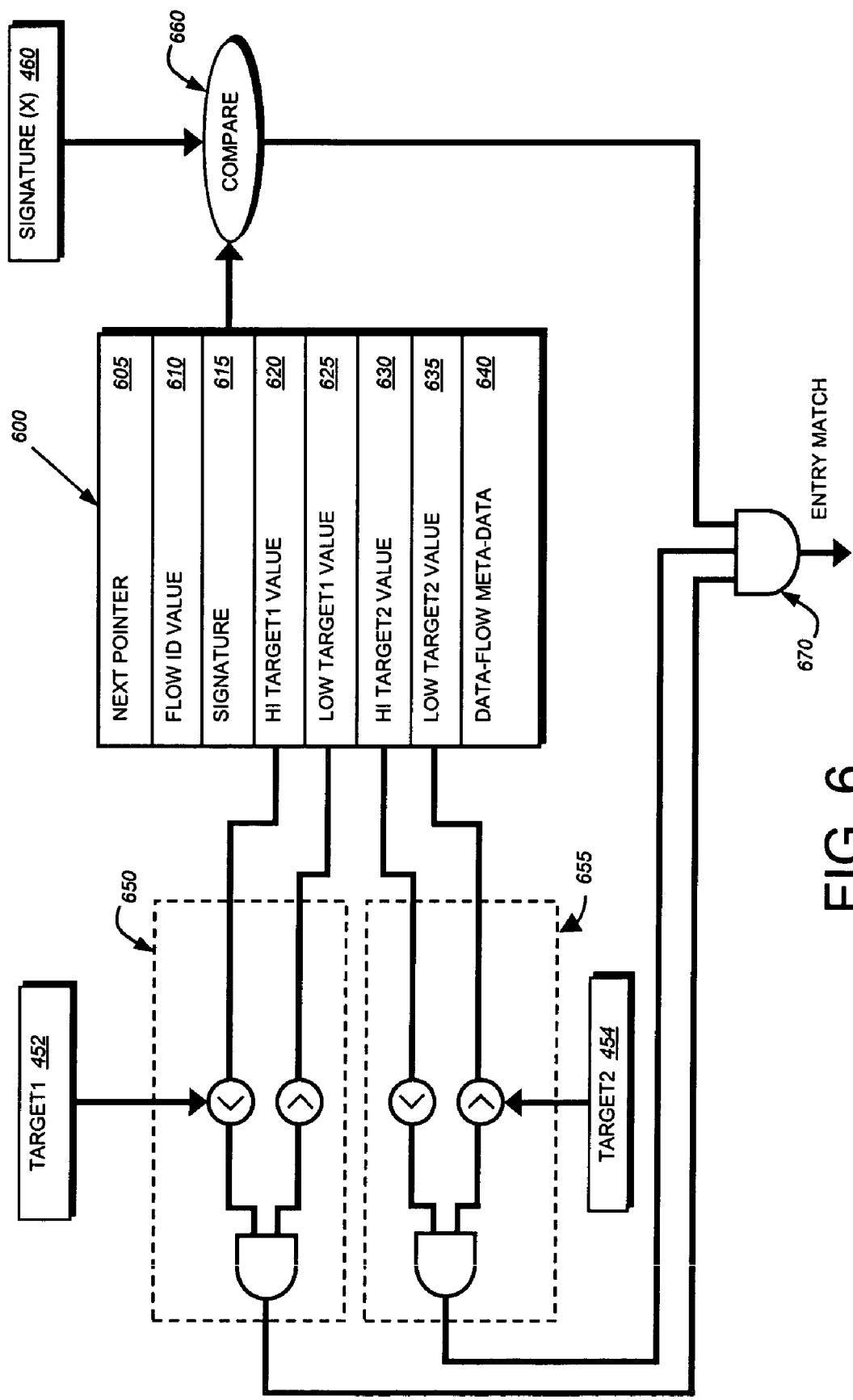
FIG. 6 is a schematic block diagram of an exemplary linked-list entry that may be accessible through a hash table and whose contained ranges may be used to perform one or more range checks.

FIG. 6 illustrates an exemplary linked-list entry 600 that may be searched by the HWA module 400 to determine whether the entry matches the received packet's extracted signature 460 and extracted target values 452 and 454. The linked-list entry 600 comprises a "next" pointer 605, a flow ID value 610, a signature 615, upper- and lower-bound values 620 and 625 associated with the target value 452, upper- and lower-bound values 630 and 635 associated with the target value 454 and data-flow meta-data 640. The next pointer 605 stores the memory location, e.g., in the memory 250, of the next, consecutive linked-list entry in the linked list. If the linked-list entry 600 is the last in the linked list, then the next pointer 605 may equal a predetermined NULL value.

The signature 615 and the target-value ranges defined by the upper- and lower-bound values 620, 625, 630 and 635 are used to determine whether the received packet 160 matches the linked-list entry 600. Notably, the upper- and lower-bound values 620 and 625 define the target-value range 550 and the pair of values 630 and 635 define the target-value range 560. The HWA module 400 determines that the linked-list entry 600 matches the received data packet 160 when at least the following three conditions are satisfied: 1) the packet's extracted signature 460 matches the signature 615, 2) the packet's extracted target value 452 is included in the target-value range defined by the upper- and lower-bound values 620 and 625 and 3) the packet's extracted target value 454 is included in the target-value range defined by the upper- and lower-bound values 630 and 635.

The HWA module 400 tests whether the first condition is satisfied by inputting both the extracted signature 460 and the signature 615 to a comparator 660. The comparator 660 outputs a logical high signal when the input values are equal and a logical low signal otherwise. The second and third conditions above are tested by the range-check circuits 650 and 655 that respectively determine whether the extracted target values 452 and 454 are included in the list entry's contained target-value ranges. For instance, if the target value 452 is less than the upper-bound value 620 and greater than the lower-bound value 625, the range-check circuit 650 outputs a logical high signal; otherwise the circuit outputs a logical low signal. Similarly, if the target value 454 is less than the upper-bound value 630 and greater than the lower-bound value 635, the range-check circuit 655 outputs a logical high signal; otherwise it outputs a logical low signal.

Although only two range-check circuits 650 and 655 are shown in FIG. 6, those skilled in the art will appreciate that the HWA module 400 may employ additional range-check circuits, depending on the number of target-value ranges stored in the linked-list entry 600. Advantageously, each range-check circuit can be selectively enabled or disabled, e.g., by a respective enable signal (not shown). Accordingly, the HWA module may be configured to selectively activate one or both of the range-check circuits 650 and 655. Moreover, the HWA module may be configured to disable both the range-check circuits, e.g., when no target values have been extracted from the packet headers 450. In such a case, for example, the output signals from the disabled range-check circuits 650 and 655 may be fixed as logical high signals.

The output signals from the comparator 660 and the range-check circuits 650 and 655 are input to a 3-input logical AND gate 670. The HWA module 400 determines the linked-list entry is a match when the output of the AND gate 670 is a logical high value. In such a case, the HWA module extracts the flow ID value 610 and forwards the extracted flow ID value to the router operating system 260. In addition, the HWA module 400 may forward to the operating system other meta-data 640 associated with the packet's data flow, when appropriate. The router operating system 260 receives the packet's identified flow ID value 610 and modifies the packet's headers 450 in accordance with the packet's flow ID value. The packet is then forwarded to an appropriate network interface 210 through which it is transmitted over the network 100.

C. Flow-Based Routing Using Efficient Hash-Table Range Retrieval

Figure 7:
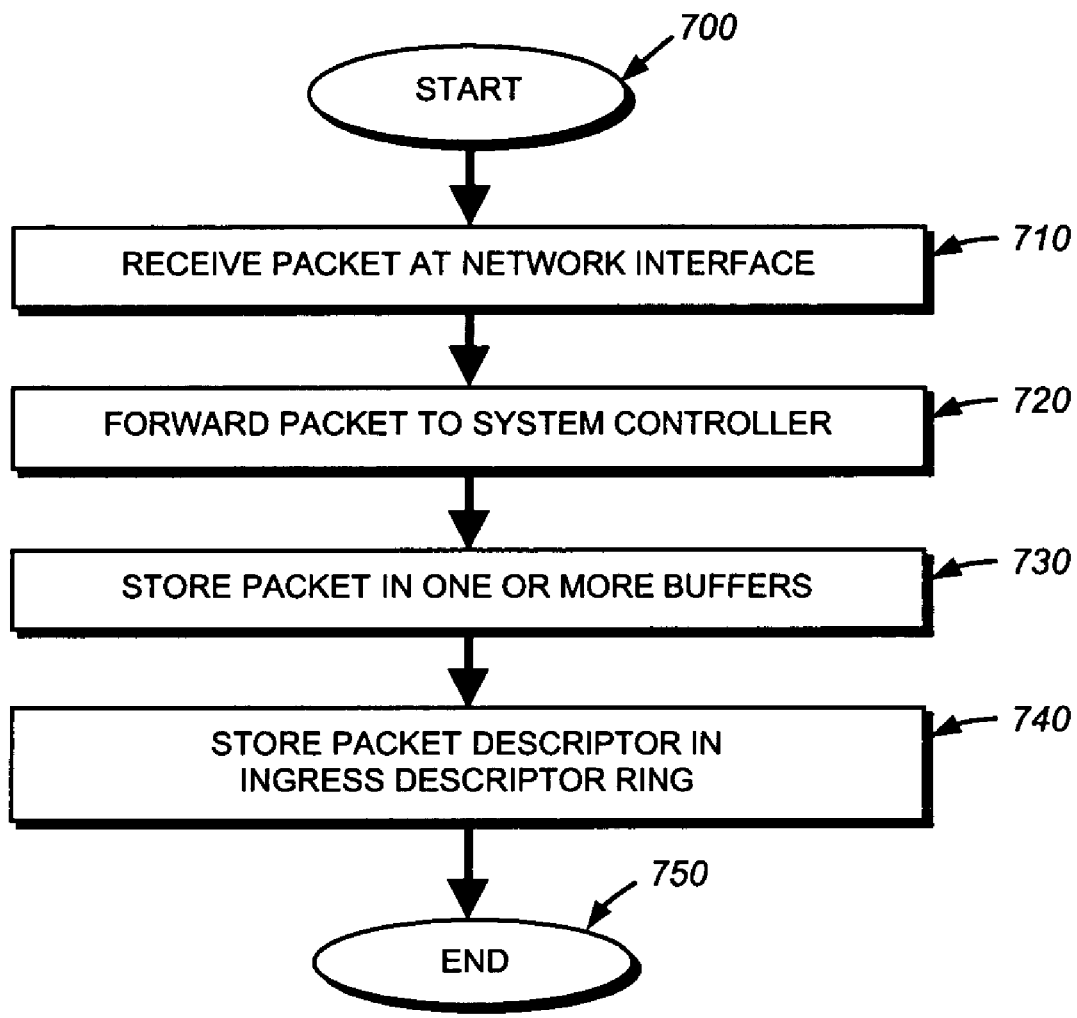
FIG. 7 is a flowchart illustrating a sequence of steps for receiving a data packet at an intermediate network node.

FIG. 7 illustrates a sequence of steps that may be performed by an intermediate node 200 configured to route received data packets using flow-based routing. The sequence starts at step 700 and proceeds to step 710 where a data packet 160 is received, e.g., from a LAN 105 or 110, at a network interface 210 in the intermediate network node. At step 720, the packet is forwarded from the network interface 210 to a system controller 300. The system controller, at step 730, stores the received packet in one or more packet buffers 280 in the intermediate network node's "in-core" memory 250. At step 740, the memory location of the packet, i.e., the packet's descriptor, is then stored in an ingress descriptor ring 290a in the memory 250. The sequence ends at step 750.

Figure 8A:
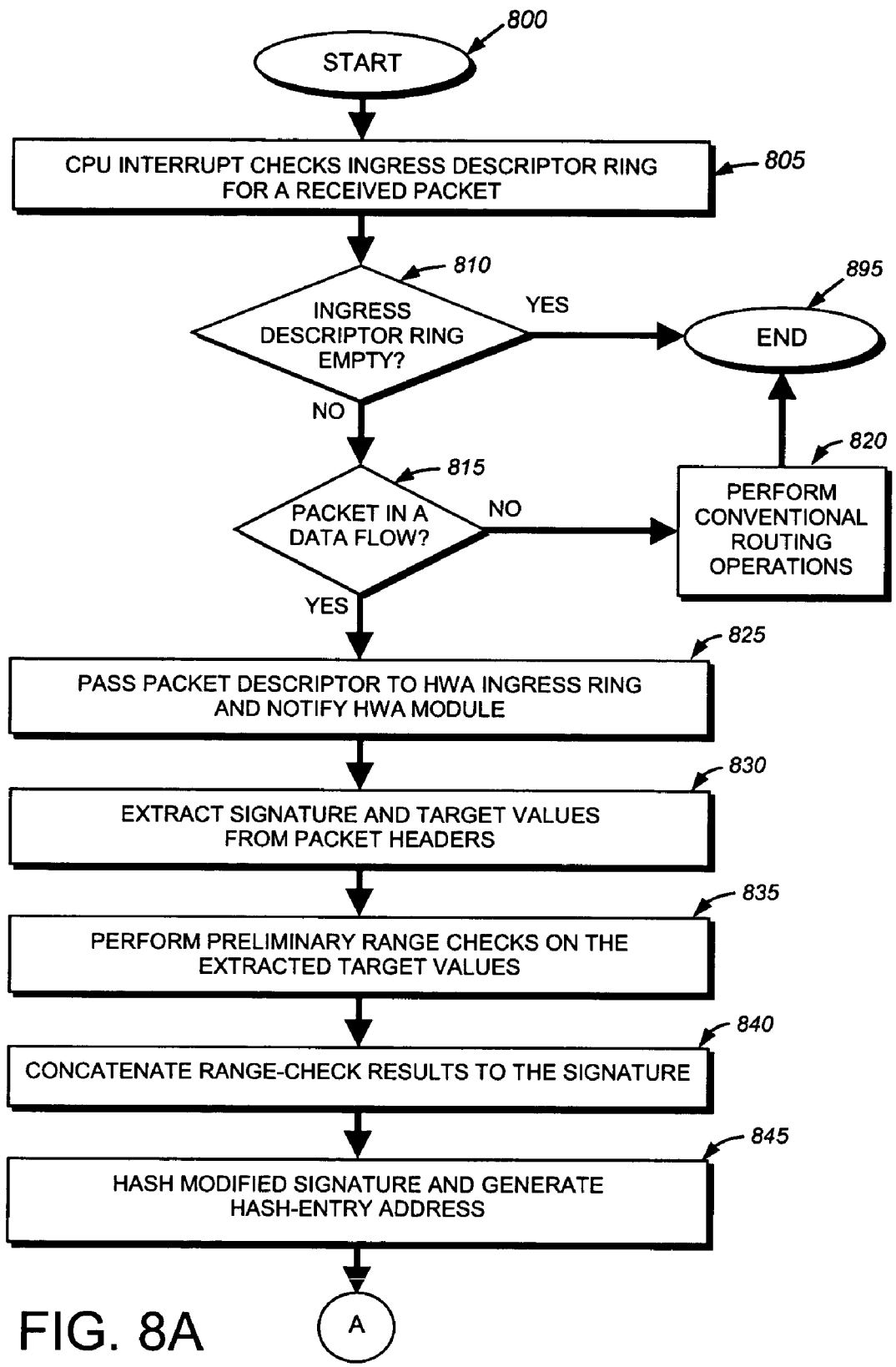
FIGS. 8A-B are a flowchart illustrating a sequence of steps for performing routing operations on a received packet, as set forth in the present invention.
Figure 8B:
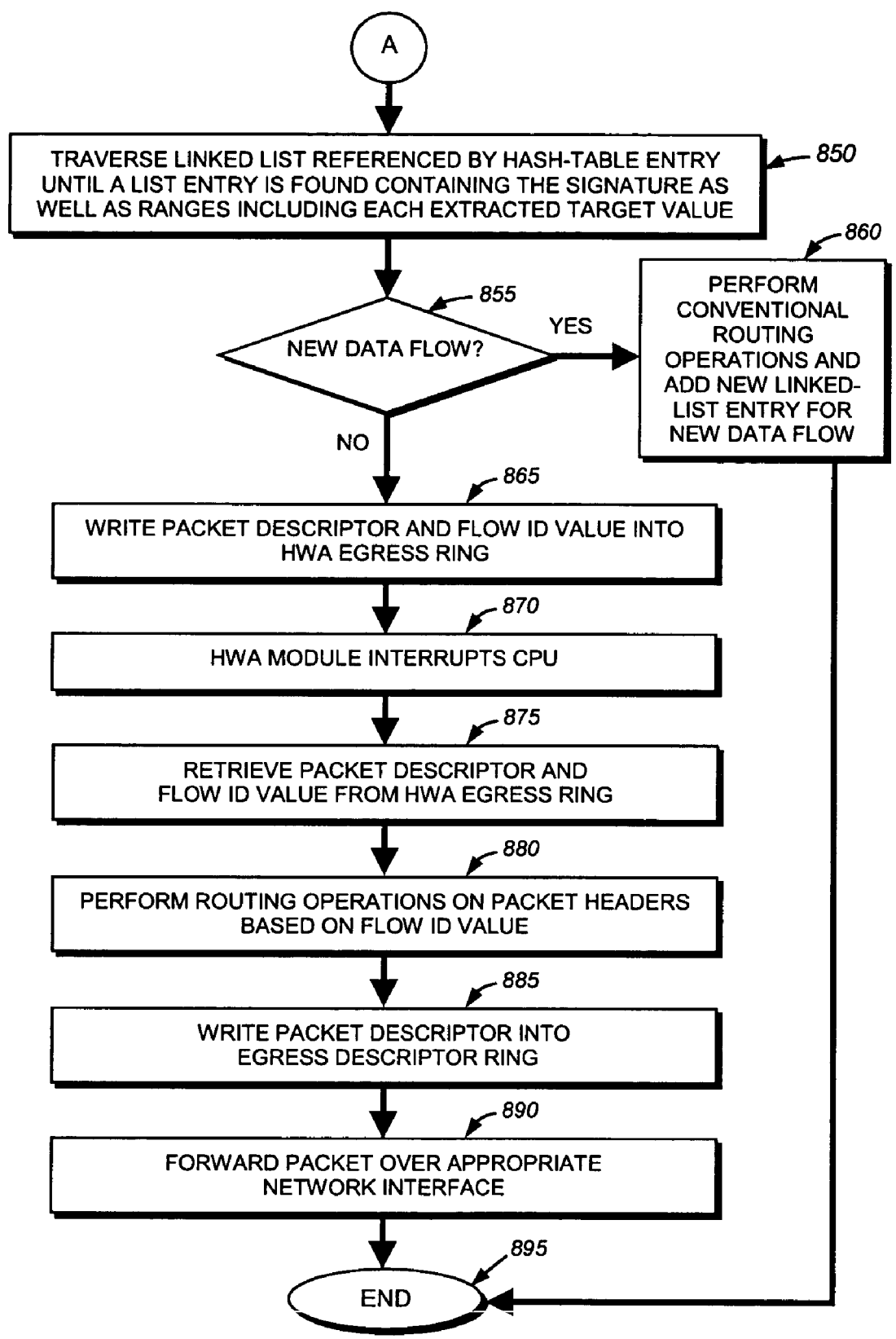

FIGS. 8A-B are a sequence of steps that may be employed by the intermediate network node 200 which is configured to perform flow-based routing in accordance with the present invention. The sequence begins at step 800 and proceeds to step 805 where an interrupt signal suspends the CPU's operations so the router operating system 260 can determine whether a new data packet 160 has been received at the intermediate network node 200. Specifically, the operating system identifies a received packet based on the contents of the ingress descriptor ring 290a. If, at step 810, the operating system determines that the ingress descriptor ring is empty, then the sequence ends at step 895.

Otherwise, at step 815, the router operating system 260 locates a descriptor at the "head" of the ingress descriptor ring 290a and makes a determination whether the descriptor references a data packet 160 that is subject to flow-based routing. For example, based on the contents of the packet's headers, the router operating system may determine that the referenced packet is a "one-time" packet or protocol data unit that is not a member of any data flow and is therefore not routed using flow-based routing operations. An example of such a one-time packet is a conventional Address Resolution Protocol (ARP) packet communicated from one intermediate network node to another. If it is determined that the referenced packet 160 is not part of a data flow, then, at step 820, the operating system 260 may perform conventional routing operations for the packet. In such a case, the packet's descriptor is dequeued from the ingress descriptor ring 290a and the packet is processed and/or forwarded in a conventional manner. The sequence ends at step 895.

At step 825, when the descriptor at the head of the ingress descriptor ring 290a references a packet 160 that is subject to flow-based routing, the router operating system dequeues the descriptor and passes it to a HWA ingress ring 290c, e.g., stored in the memory 250. The HWA ingress ring is a circular buffer (i.e., a finite length first-in first-out queue) that stores an ordered list of packet descriptors whose referenced packets may be processed by the HWA module 400. Accordingly, the operating system 260 notifies the HWA module, e.g., by setting an appropriate flag or semaphore value, that a packet descriptor has been added to the HWA ingress ring.

At step 830, the HWA module 400 extracts signature information 460 and target values 452 and 454 from the packet headers 450 of the descriptor's referenced data packet. At step 835, the module 400 performs different sets of preliminary range checks on each of the extracted target values. To that end, one or more range-check circuits 430 may be employed in the HWA module for performing the preliminary range checks. Further, a plurality of the preliminary range checks are preferably performed in parallel. In the illustrative embodiment, each range-check circuit 430 generates a binary output value that is stored in a corresponding position in an output vector 415 or 425. At step 840, the contents of the output vectors are concatenated to the extracted signature 460 to generate a modified signature.

At step 845, a hash function, such as a CRC-32 function, is applied to the modified signature and the resultant hash value is used to generate a memory address 495 of a specific hash-table entry 510 in the hash table 500. To that end, the generated hash value may be output from a hash-function unit 470 and subsequently input to a bit mask unit 480 that selects n of the generated hash bits. The hash-entry address 495 then may be derived by combining the n masked bits with the hash table 500's base memory address 490, e.g., in the memory 250. Illustratively, the hash-table entry 510 corresponding to the generated hash-entry address 495 contains a list pointer 530 that references a linked list whose linked-list entries 600 store information related to different data flows.

At step 850, the HWA module 400 traverses the linked list referenced by the hash-table entry 510's list pointer 530 until a linked-list entry 600 is found that matches the packet 160. Specifically, a matching list entry 600 contains the packet's extracted signature 460 as well as target-value ranges 550 and 560 that respectively include each of the packet's extracted target values 452 and 454. If, at step 855, no matching entry can be found, the HWA module determines that the data packet is a member of a new data flow. In this case, the HWA module 400 notifies the router operating system 260 that a new flow has been identified, and, at step 860, the operating system performs conventional routing operations for the packet. In addition, the operating system also adds a linked-list entry 600 for the newly identified data flow to an appropriate list in the hash table 500. Then, the sequence ends at step 895.

On the other hand, if a matching linked-list entry 600 is identified at step 855, the HWA module 400 retrieves the packet's associated flow ID value 610 stored at a predetermined offset in the matching list entry. At step 865, the module 400 writes both the packet descriptor and the packet's identified flow ID value 610 into a HWA egress ring 290d, e.g., a circular first-in first-out queue stored in the memory 250. Next, at step 870, the HWA module interrupts the CPU 230 so as to notify the router operating system 260 that the packet descriptor and flow ID value have been written to the HWA egress ring. In response, the router operating system 260 retrieves the packet descriptor and flow ID value from the HWA egress ring, at step 875. Then, at step 880, the operating system performs routing operations for the packet 160 in accordance with the packet's flow ID value 610. To that end, the operating system may access a data structure, e.g., stored in the memory 250, that "maps" flow ID values 610 to routing information 270 associated with the flow ID values' corresponding data flows.

After the operating system 260 makes a forwarding decision for the packet 160, at step 885, the packet's headers 450 are updated and the packet's descriptor is written into an egress descriptor ring 290b, e.g., in the memory 250. The packet is then forwarded over an appropriate network interface 210, at step 890, and its descriptor is then removed from the egress descriptor ring. The sequence ends at step 895. The steps 800-895 may be repeated periodically in order to route different data packets received by the intermediate network node 200.

D. Conclusion

The foregoing has been a detailed description of illustrative embodiments of the invention. Various modifications and additions can be made without departing from the spirit and scope of the invention. For example, although the hash-table searching technique described herein is applied to flow-based processing, the technique is more generally applicable to any hash-based range searches. For instance, the HWA module 400 in the intermediate network node 200 may be configured to search the hash table 500 for other information besides searching for flow ID values 610. Such other information for which range searches may be performed in accordance with the invention include, inter alia, access-control lists, network address translations, intrusion detection information, firewall information, etc.

In addition, the extracted target values and signature information associated with a received packet 160 are not limited to those values stored in fields of the packet's headers 450, e.g., and may be extracted from other portions of the packet's contents. As described in the illustrative embodiment, the comparator 660 is configured to determine whether the signature 615 stored in the linked-list entries 600 equals the extracted signature 460. However, it is also contemplated that the signature 615 stored in the linked-list entries alternatively may be the result of hashing the signature 460. In this case, the comparator 660 outputs a logical high signal when the signature 615 equals the result of hashing the extracted signature 460. Further, the predefined ranges associated with the preliminary range checks and the target-value range checks need not explicitly include their corresponding upper- and lower-bound values.

Although the inventive technique is described in terms of a single hash table 500, the technique is equally applicable for a plurality of different hash tables that are each configured as set forth in the illustrative embodiment. For instance, a separate hash table 500 may be associated with each network interface 210 in the intermediate network node 200. As such, packets received at a particular network interface may be routed in accordance with flow ID values 610 stored in that network interface's associated hash table. Moreover, in multiprocessor implementations, a plurality of CPUs 230 may access one or more hash tables 500 in accordance with the present invention.

It is expressly contemplated that the teachings of this invention can be implemented as software, including a computer-readable medium having program instructions executing on a computer, hardware, firmware, or a combination thereof. The inventive technique therefore may be implemented in various combinations of hardware and/or software. Accordingly, this description is meant to be taken only by way of example and not to otherwise limit the scope of the invention.

What is claimed is:

1. A method for efficiently searching a hash table containing a plurality of ranges, the method comprising:

performing one or more preliminary range checks on at least one target value, each preliminary range check generating an output value having a value dependent on whether the target value is included in a predefined range of values associated with the preliminary range check;

combining signature information with the output values generated by the preliminary range checks to generate a modified signature;

applying a predetermined function to the modified signature to derive an index that references a hash-table entry in the hash table;

locating a searchable data structure associated with the hash-table entry referenced by the index, the searchable data structure comprising one or more search nodes, at least one of the search nodes configured to store one or more target-value ranges associated with the target value;

searching the search nodes in the searchable data structure until a matching search node is found whose stored target-value ranges associated with the target value include the target value; and providing information associated with the matching search node.

2. The method of claim 1, wherein the searchable data structure is a linked list and the search nodes in the searchable data structure are linked-list entries.

3. The method of claim 1, wherein the output values generated by the preliminary range checks are concatenated with the signature information to generate the modified signature.

4. The method of claim 1, wherein the step of searching the search nodes in the searchable data structure further comprises:

searching the search nodes until a matching search node is found that not only stores target-value ranges including their associated target values, but also stores the signature information.

5. The method of claim 4, wherein the signature information and the target value are obtained from predetermined fields in a packet's network headers or from other packet-related information.

6. The method of claim 5, wherein the information associated with the matching search node is data-flow information and the method further comprises:

extracting the data-flow information from the matching search node, the data-flow information being used to route the packet.

7. The method of claim 1, wherein the step of applying a predetermined function to the modified signature generates one or more output bits, and a predetermined set of the output bits are masked to derive the index.

8. An intermediate network node configured to perform flow-based processing, the intermediate network node comprising:

a network interface for receiving a data packet;

a memory configured to store a hash table organized as a plurality of indexed hash-table entries, each hash-table entry associated with a corresponding linked list and each linked list containing one or more linked-list entries; and a system controller configured to efficiently search the hash table, the system controller configured to:

obtain signature information and at least one target value from a set of predetermined fields in the received packet's network headers;

perform one or more preliminary range checks on at least one of the target values, each preliminary range check generating an output value having a value dependent on whether the target value is included in a predefined range of values associated with the preliminary range check;

combine the signature information with the output values generated by the preliminary range checks to generate a modified signature;

apply a predetermined function to the modified signature to derive an index that references a hash-table entry in the hash table;

locate a linked list associated with the hash-table entry referenced by the index, the linked list comprising one or more linked-list entries, each entry configured to store at least one target-value range associated with the target value;

search linked-list entries in the linked list until a matching linked-list entry is found whose stored target-value ranges associated with the target value include the target value; and provide information associated with the matching linked-list entry.

9. The intermediate network node of claim 8, further comprising a processor, wherein the memory is further configured to store instructions for execution by the processor, at least a portion of the instructions defining a router operating system configured to route the received packet based on a data flow associated with the received packet.

10. The intermediate network node of claim 9, wherein the information associated with the linked-list entry is data-flow information and the system controller identifies the data-flow information stored in the matching linked-list entry and transfers the data-flow information to the router operating system which routes the received packet in accordance with the data-flow information.

11. The intermediate network node of claim 8, wherein the system controller searches the linked-list entries until a matching linked-list entry is found that not only stores target-value ranges including their associated target values, but also stores the signature information.

12. The intermediate network node of claim 11, further comprising a processor, wherein the memory is further configured to store instructions for execution by the processor, at least a portion of the instructions defining a router operating system configured to route the received packet based on a data flow associated with the received packet.

13. The intermediate network node of claim 12, wherein the information associated with the linked-list entry is data-flow information and the system controller identifies the data-flow information stored in the matching linked-list entry and transfers the data-flow information to the router operating system which routes the received packet in accordance with the data-flow information.

14. An apparatus for efficiently searching a hash table containing a plurality of ranges, the method comprising:

means for performing one or more preliminary range checks on at least one target value, each preliminary range check generating an output value having a value dependent on whether the target value is included in a predefined range of values associated with the preliminary range check;

means for combining signature information with the output values generated by the preliminary range checks to generate a modified signature;

means for applying a predetermined function to the modified signature to derive an index that references a hash-table entry in the hash table;

means for locating a searchable data structure associated with the hash-table entry referenced by the index, the searchable data structure comprising one or more search nodes, at least one of the search nodes configured to store one or more target-value ranges associated with the target value;

means for searching the search nodes in the searchable data structure until a matching search node is found whose stored target-value ranges associated with the target value include the target value; and means for providing information associated with the matching search node.

15. The apparatus of claim 14, wherein the searchable data structure is a linked list and the search nodes in the searchable data structure are linked-list entries.

16. The apparatus of claim 14, wherein the output values generated by the preliminary range checks are concatenated with the signature information to generate the modified signature.

17. The apparatus of claim 14, further comprising:

means for searching the search nodes in the searchable data structure until a matching search node is found that stores target-value ranges including their associated target values and also stores the signature information.

18. The apparatus of claim 17, wherein the signature information and the target values are obtained from predetermined fields in a packet's network headers or from other packet-related information.

19. The apparatus of claim 18, wherein the information associated with the matching search node is data-flow information and the apparatus further comprises:

means for extracting the data-flow information from the matching search node, the data-flow information being used to route the packet.

20. The apparatus of claim 14, wherein the means for applying a predetermined function to the modified signature generates one or more output bits and a predetermined set of the output bits are masked to derive the index.

21. A computer-readable media including instructions for execution by a processor, the instructions for efficiently searching a hash table comprising a plurality of ranges, the instructions when executed operable to:

perform one or more preliminary range checks on at least one target value, each preliminary range check generating an output value having a value dependent on whether the target value is included in a predefined range of values associated with the preliminary range check;

combine signature information with the output values generated by the preliminary range checks to generate a modified signature;

apply a predetermined function to the modified signature to derive an index that references a hash-table entry in the hash table;

locate searchable data structure associated with the hash-table entry referenced by the index, the searchable data structure comprising one or more search nodes, at least one of the search nodes configured to store one or more target-value ranges associated with the target value;

search the search nodes in the searchable data structure until a matching search node is found whose stored target-value ranges associated with the target value include the target value; and provide information associated with the matching search node.

* * * * *

UNITED STATES PATENT AND TRADEMARK OFFICE
CERTIFICATE OF CORRECTION

| | | |
|---|---|---|
| PATENT NO. | : 7,346,059 B1 | Page 1 of 1 |
| APPLICATION NO. | : 10/657497 | |
| DATED | : March 18, 2008 | |
| INVENTOR(S) | : Trevor Garner | |

It is certified that error appears in the above-identified patent and that said Letters Patent is hereby corrected as shown below:

Col. 3, Line 43, please amend as shown:

list entry is located, the entry's stored flow ID is used to

Col. 4, Line 40, please amend as shown:

signature's associated ranges are more evenly distributed

Col. 6, Line 41, please amend as shown:

memory 250 by different local buses in the intermediate[[d]]

Col. 8, Line 52, please amend as shown:

signature's associated ranges are more evenly distributed

Col. 18, Line 53, please amend as shown:

locate a searchable data structure associated with the hash-

Signed and Sealed this

Second Day of November, 2010

David J. Kappos
*Director of the United States Patent and Trademark Office*